United States Patent [19]

Salemann

[11] Patent Number: 5,054,288
[45] Date of Patent: Oct. 8, 1991

[54] BYPASS DUCT FOR A HYPERSONIC PROPULSION SYSTEM

[75] Inventor: Victor Salemann, Issaquah, Wash.

[73] Assignee: The Boeing Company, Seattle, Wash.

[21] Appl. No.: 261,570

[22] Filed: Oct. 24, 1988

[51] Int. Cl.[5] .......................... F02C 7/10; F02C 11/00
[52] U.S. Cl. ...................................... 60/244; 60/270.1
[58] Field of Search ................... 60/244, 245, 270.1, 60/39.33, 224, 225, 262, 264

[56] References Cited

U.S. PATENT DOCUMENTS

| | | |
|---|---|---|
| 2,572,723 | 12/1951 | Hildestad . |
| 2,696,078 | 12/1954 | Waitzman . |
| 2,800,765 | 7/1957 | French et al. . |
| 2,896,408 | 7/1959 | O'Donnell ........................ 60/39.33 |
| 2,899,799 | 8/1959 | Setterbalde . |
| 2,934,895 | 5/1960 | Gregory et al. . |
| 3,032,977 | 5/1962 | Neitzel . |
| 3,161,018 | 12/1964 | Sandre . |
| 3,280,564 | 10/1966 | Keenan et al. ........................ 60/244 |
| 3,296,800 | 1/1967 | Keenan et al. ........................ 60/244 |
| 3,604,211 | 9/1971 | Ghougasian ........................ 60/244 |
| 3,635,029 | 1/1972 | Menioux . |
| 3,670,964 | 6/1972 | Pedersen ........................ 60/244 |
| 3,938,328 | 2/1976 | Klees ........................ 60/244 |
| 4,185,457 | 1/1980 | Parker et al. . |
| 4,543,785 | 10/1985 | Patrick . |

Primary Examiner—Louis J. Casaregola
Attorney, Agent, or Firm—Seed and Berry

[57] ABSTRACT

A cold-air bypass duct in a hypersonic engine having a turbojet engine and a ramjet engine in the same housing. A common air inlet and exhaust nozzle are provided for the turbojet and ramjet engines. The air inlet is designed to provide the necessary air for the ramjet engine at maximum air requirements. Less air is needed by the turbojet engine when it is in operation. The excess air entering the inlet during turbojet engine operation enters a bypass duct normally used for ramjet operation. The air entering the bypass duct exits the housing behind the ram burner and turbojet nozzle throat. When the ramjet operates, a vent in the bypass duct opens to direct a portion of the air into the ram burner. When the ramjet engine is operating at maximum air requirements, all the air entering the bypass duct enters the ram burner. The bypass duct is a single duct with a vent and an associated barrier that are openable to multiple positions. Alternatively, a plurality of bypass ducts are provided, each having respective vents operating independently to direct the required amount of air into the ramjet.

19 Claims, 2 Drawing Sheets

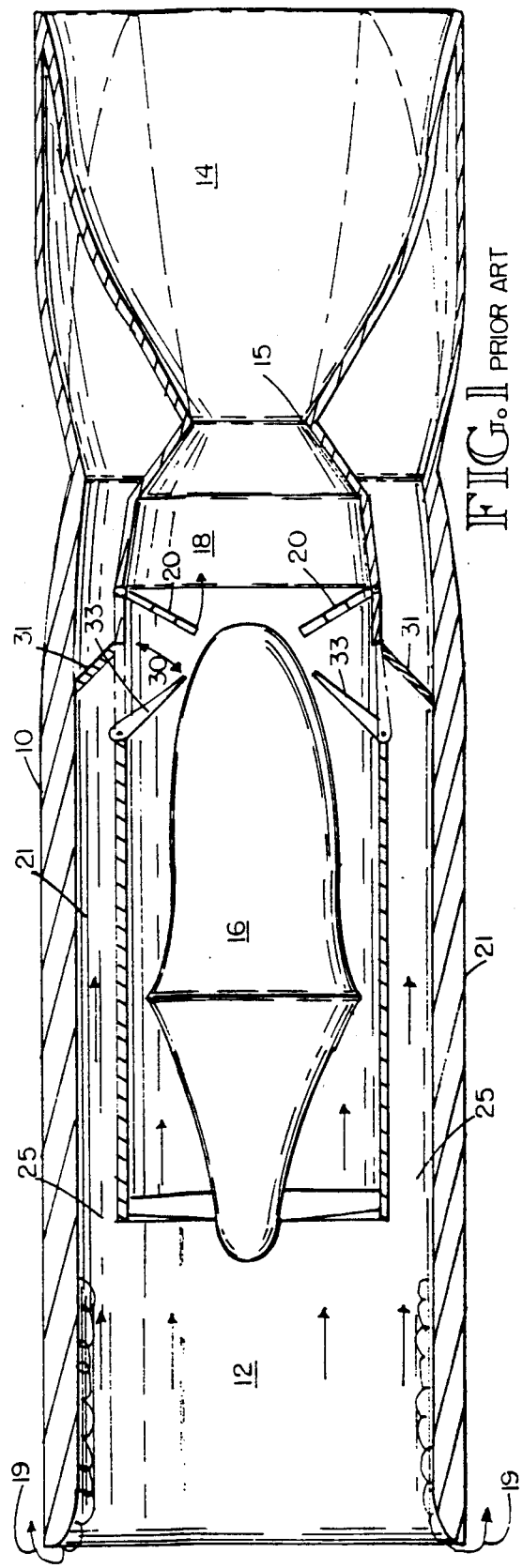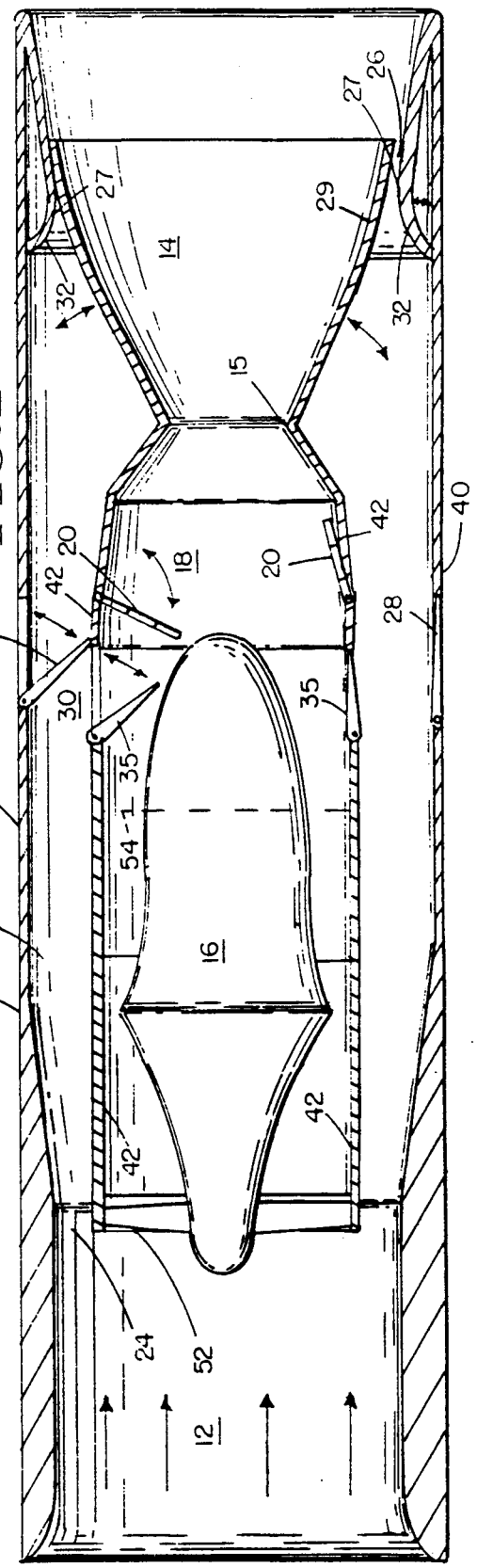

ured air. When more air attempts to enter the inlet than can be used by the engines, the excess air is rejected at the front of the inlet, causing spillage and considerable drag.

One approach for overcoming spillage drag is to vary the size of the inlet at different speeds to provide more or less air, depending on the needs of the engines. As the inlet lip area is reduced, spillage drag is traded for cowl drag. While this may be helpful, the air intake requirements for a ramjet engine at a maximum speed of Mach 6 are so great compared to the air intake permitted by a turbojet engine at minimum air requirements that considerable adjustment is needed in the size of the inlet.
BYPASS DUCT FOR A HYPERSONIC PROPULSION SYSTEM

STATEMENT OF GOVERNMENT INTEREST

The United States Government has certain rights in this invention.

TECHNICAL FIELD

This invention relates to hypersonic propulsion systems, and more particularly, to a method and apparatus permitting air entering the common inlet of a turbo-ramjet engine to bypass the ram burner when the ram burner is not operating and to enter the ram burner when the ram burner is operating.

BACKGROUND ART

Hypersonic propulsion systems are designed to efficiently provide thrust at speeds from takeoff, below Mach 1, to speeds above Mach 5. Specially designed engines, air inlets and exhaust nozzles are needed to provide thrust for this broad range of speeds and not produce excess drag at any speed.

A hypersonic propulsion system has two engines, a turbojet engine and a ramjet engine. In some designs, the ramjet engine is in the form of a ram burner located within the exhaust flow of the turbojet engine. According to present designs, only the turbojet engine operates at speeds below approximately Mach 2 or 3, and only the ramjet engine operates at speeds above Mach 2 or 3. The turbojet exhausts through the ramjet burner and must be throttled or shut down when ramjet operation starts. In the latter design, both engines are mounted in tandem in the same housing and use a common inlet and exhaust nozzle. In other designs, termed "wraparound" or "over and under," the ramjet is located in a separate flow duct from the turbojet, but a common inlet is used. The exhaust nozzle may or may not be common to both, depending on the design. Only the turbojet operates below Mach 1 and only the ramjet operates above Mach 3, but both may operate between Mach 1 and Mach 3 if desired.

The ramjet engine requires considerably more intake air than the turbojet engine. The common inlet must be made large enough to provide the maximum required air to the ramjet engine. Maximum air intake is required at the highest operating speed. The amount of air taken into a ramjet engine is one of the limiting factors that determines the maximum thrust attainable by the engine. It is desirable to attain very high thrusts at high speeds, thus requiring great amounts of air to enter the ramjet engine.

The large air intake that is required at maximum speeds requires a large inlet. Under certain speed and thrust conditions, the engine cannot utilize all of the captured air. When more air attempts to enter the inlet than can be used by the engines, the excess air is rejected at the front of the inlet, causing spillage and considerable drag.

One approach for overcoming spillage drag is to vary the size of the inlet at different speeds to provide more or less air, depending on the needs of the engines. As the inlet lip area is reduced, spillage drag is traded for cowl drag. While this may be helpful, the air intake requirements for a ramjet engine at a maximum speed of Mach 6 are so great compared to the air intake permitted by a turbojet engine at minimum air requirements that considerable adjustment is needed in the size of the inlet. Further, adjusting the size of the inlet is difficult, and the machinery to provide the adjustment adds weight to the aircraft.

A second approach is to provide shutters in the inlet duct wall after the air inlet but prior to the engines. When less air is needed, the shutters are opened and a portion of the air entering the inlet exits prior to reaching the engines. When more air is needed, the shutters are closed and all the air entering the inlet also enters the engines. One disadvantage of this approach is that the shutters themselves create a drag, both outside the housing and inside the housing, and air dumped through open shutters develops only a fraction of the potential thrust of that air.

Hypersonic propulsion systems also require large nozzle exit areas to produce thrust efficiently at high speeds, but much smaller exit areas at intermediate speeds up to approximately Mach 2. The required machinery to vary the nozzle exit area adds weight to the craft.

DISCLOSURE OF THE INVENTION

It is an object of this invention to provide that excess air entering the common inlet bypasses the turbojet using the duct provided for ramjet operation and exits behind the throat of the nozzle.

It is another object of this invention that air entering the inlet bypass the ram burner when the ramjet engine is not operating and enter the ram burner when it is operating.

It is another object of this invention to minimize inlet drag created by the turbo-ramjet engine when the turbojet engine is operating but the ramjet engine is not operating.

It is another object of this invention to reduce external nozzle drag.

These and other objectives are accomplished by providing a controlled bypass around the ram burner and turbojet nozzle throat. A single housing encloses a turbojet engine and a ramjet engine having a common air inlet. A bypass duct is provided that permits air to bypass the turbojet and selectively enter or bypass the ramjet. The bypass duct inlet is behind the air inlet but in front of the turbojet engine. The bypass duct terminates either behind or within the common exhaust nozzle. The extended bypass duct allows air entering the inlet to bypass the turbojet and ram burner as cold-air bypass when the ramjet is not in operation but selectively channels air into the ramjet when the ramjet is in operation. A vent and an associated barrier are provided in the bypass duct. When the vent is closed, all air entering the bypass duct exits at the outlet after the throat of the nozzle; but when the vent is open and a barrier is placed in the bypass duct, all air entering the bypass duct enters the ram burner. The vent is movable to a plurality of positions to permit the amount of air entering the ram burner to be varied. In one embodiment, a plurality of bypass ducts are provided, each having a vent and barrier that operate independently of each other to provide different amounts of air to bypass the ram burner or enter the ram burner, depending on the air requirements. In an alternative embodiment, the ram burner is either over, under, or wrapped around the turbojet and forms the cold-air bypass duct when little or no combustion is desired in the ram burner.

BRIEF DESCRIPTION OF THE DRAWINGS

FIG. 1 is a partial cross section of a prior art tandem turbo-ramjet engine without the bypass feature of the present invention.

FIG. 2 is a partial cross section of a tandem ramjet engine with the bypass duct.

BEST MODE FOR CARRYING OUT THE INVENTION

Figure 3:
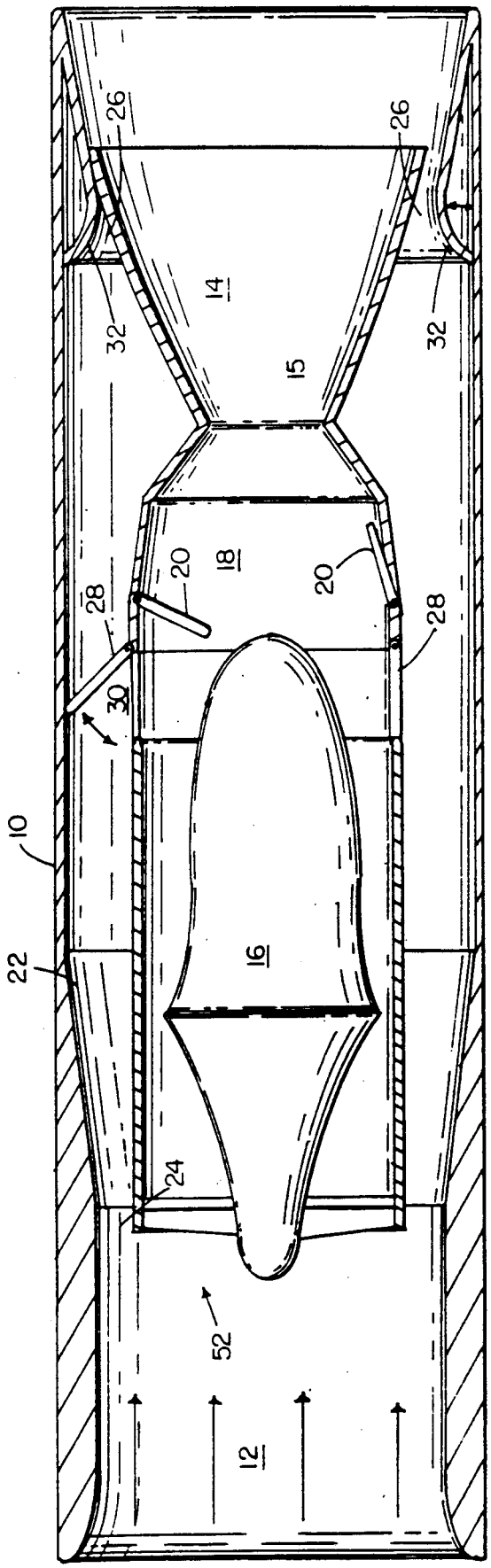
FIG. 3 is a partial cross section of a tandem turbo-ramjet engine with an alternative embodiment of the vent and barrier.

A prior art tandem turbo-ramjet engine is shown in FIG. 1. The engine includes turbojet engine 16 and ram burner or ramjet engine 18 having flame holders 20. A common air inlet duct 12 is mounted ahead of the engines. A common exhaust nozzle 14 is mounted behind the engines. The exhaust nozzle includes throat 15. The details of the forward and ramp portions of air inlet 12 are not shown and any suitable air inlet may be used with this engine.

The dotted line position of door 33 of FIG. 1 illustrates operation of the prior art turbojet engine with the ram burner not in operation. Air flows through the turbojet engine and is exhausted at the rear of the turbojet engine, just prior to the ram burner flame holder 20. Air entering duct 21 at duct inlet 25 is blocked by barrier 31 and does not exit at any location within the engine or vent to the outside. The door 33 is closed and air cannot enter the ram burner. This results in air being blocked at the entrance 25 to duct 21, causing interference in the flow pattern within the inlet plus spillage 19 out of the front of the inlet, resulting in drag. The exhaust nozzle is in the position shown by the dotted lines when only the turbojet is operating.

The solid line position of door 33 of FIG. 1 illustrates prior art engine operation with the ram burner in operation. The door 33 is opened to permit air to enter the ram burner through vent 30. The door 33 also blocks air flow through the turbojet engine region 16. The door 33 prevents high-temperature air in the ram burner from entering the turbojet during ramjet operation. All of the air entering the inlet 12 is forced into duct 21 and into the ramjet region 18. The exhaust nozzle is moved to the outer position, as shown in solid lines in FIG. 1.

In prior art tandem Turbo-ramjet engines, inlet air which cannot be utilized by the turbojet generally cannot bypass the turbojet utilizing ramduct 21 and enter after-burner 18 through a partially opened door 33 while the turbojet is operating, because the pressure level of the air in the ramjet is generally much lower than the pressure level of the turbojet exhaust.

Thus, in the tandem turbo-ramjet engine of the prior art, the turbojet and ramjet generally cannot be operated at the same time. The turbojet must be closed off and shut down to permit ramjet operation to occur. This limits the uses and efficiency of the tandem turbo-ramjet engine.

The hypersonic propulsion system of the present invention includes a housing 10 having an inlet region 12 and a nozzle region 14 solidly coupled thereto, as shown in FIG. 2. The inlet may be of any type presently in use or under design, including inlets that are adjustable to vary the volume of air entering the inlet. Nozzle 14 includes a throat 15, constituting the maximum restriction of the flow path. The nozzle is adjustable to many different throat and exit areas and shapes.

A turbojet or turbofan engine region 16 and a ram burner 18 having flame holders 20 are within the common housing 10. The turbine engine and ram burner may be any of known types but within the group designed to provide thrust at speeds from takeoff to above the speed of sound. Normally, only the turbojet will operate below speeds of Mach 1.0 and only the ramjet will operate at speeds above Mach 3.5. At speeds between Mach 1.0 and 3.5, both the ramjet and turbojet may be operated.

Annular bypass duct 22 is provided at the outer region of housing 10 and has an air inlet 24 and an air exit 26. The bypass duct 22 is made large enough to pass all the excess inlet flow not utilized by the turbine engine. This requires a significantly larger bypass duct 22 than provided as the air intake duct 21 to the ram engine of the prior art. The bypass duct inlet 24 is behind the common air inlet 12 but prior to the turbojet engine 16. A barrier 28 and a vent 30 are associated with the bypass duct. The vent 30 is positioned behind the air intake of the turbojet engine but prior to the ram burner.

The bypass duct air exit 26 is located behind the throat 15 of the nozzle 14. This is to ensure that exhaust from the turbojet, when the turbojet is in operation, does not enter the bypass duct through exit 26. The pressure difference between the bypass air and the turbojet exhaust air may be sufficient to permit turbojet exhaust to enter the exit of the bypass duct if the exit 26 is not properly positioned with respect to the throat of the nozzle. The bypass exit 26 is formed by structure 32, which is shaped to form a part of an adjustable nozzle. The bypass exit structure 32 includes a throat 27, located ahead of the bypass outlet. The throat 27 may be opened to a variety of different positions, by movement of either exhaust structure 29 or outlet structure 32, or both. Alternatively, the throat 27 may be completely closed, as shown in the top portion of FIG. 2. When the air exit 26 is closed, structure 32 forms an extension to the ramjet nozzle.

The vent 30 is shown in the open position in the top portion of FIG. 2 and in the closed position in the bottom portion of the engine of FIG. 2 for illustration purposes. Usually the top and bottom portions will be the same. When the vent member 35 is fully opened, it also seals off the turbojet engine. The barrier 28 is movable to a plurality of different positions. If the barrier abuts against outer wall 40, less air enters the ram burner through vent 30 than would enter if the barrier 28 blocks the flow, either partially or completely.

When the vent 30 is closed, as shown in the bottom portion of FIG. 2, no air enters the ram burner from the bypass duct. All air entering the ram burner first enters the turbojet engine. All the air entering the bypass duct bypasses both the turbojet and ram burner and exits at 26.

The vent 30 may be partially opened with the barrier 28 positioned between the outer surface 40 of duct 22 and the inner surface 42. In this position, a portion of the air entering the duct 22 bypasses the turbojet engine but enters the ram burner, and a portion bypasses both the turbojet engine and the ram burner and exits at 26. If the vent is opened only slightly, providing a small opening in inner surface 42 into the ram burner, then very little air enters the ram burner from the bypass duct and most of the air bypasses the ram burner. Similarly, if the vent is mostly open, then most of the air in the bypass duct enters the ram burner and a smaller portion of the air exits at 26.

The positionable barrier 28 permits the amount of air provided from the bypass duct to the ram burner 18 to be easily varied according to the ram burner's air requirements. Reducing the amount of air entering the ram burner does not create significant additional inlet spillage drag because the air not entering is permitted to exit through the throat 27 of the bypass duct.

The position of barrier 28 can be used to control the air requirements to the ramjet engine in response to the thrust desired by the pilot. As the pilot requires more thrust, a signal is sent to a control mechanism to open vent 30 further and/or move barrier 28 to provide the additional air required, and to adjust the fuel flow. The control mechanism may be connected to a computer or other feedback system that senses the air requirements of the ramjet and automatically adjusts either the vent or the barrier, or both, to provide the correct amount of air and fuel. This permits maintaining the optimum fuel/air ratio while varying thrust of the ramjet without varying the total inlet flow during climb, acceleration, high-speed cruise and high-speed maneuvers. In contrast, when reduced thrust is required in current art ramjets, either inlet airflow is reduced, which causes drag, or the air/fuel ratio is reduced, which may cause inefficient operation or even a blowout in the ram burner.

Shutters 52 at the front of the turbojet and shutters 54 at the rear of the turbojet are generally used to block airflow through the turbojet at high flight Mach numbers when the inlet air temperature becomes too high. Vent member 35 may be used instead of shutters 54 to block the flow of hot air into the turbojet, if desired.

The barrier 28 is not necessary in one embodiment of the invention. The opening and closing of nozzle 26, usually at the throat 27, using structure 32 are effective to control the flow of air exiting at the vent. If the nozzle 26 is closed, all the air must exit at the vent. If the nozzle is partly or fully opened, air may exit from the nozzle. The vent member 35 in conjunction with nozzle opening 26 can be used to control the amount of air entering the ramjet engine without the use of a separate barrier 28, if desired. In this embodiment, the throat 27 effectively forms the barrier and a separate barrier member is not required.

The embodiment of FIG. 3 uses barrier 28 to perform the dual function of opening the vent and blocking the duct to force air through the vent and thus into the ram burner. In the embodiment of FIG. 2, the vent member 31 and the barrier are separate members, a vent member 35 acting to open the vent 30 and a separate barrier member 28, located away from the vent if desired, being used to direct the desired amount of air into the vent. The shape of barrier 28 should be such as to efficiently channel the air into the ram burner or exit 26 without causing excessive drag. It may be necessary to shape barrier 28 of FIG. 3 as a type of inlet surface or exhaust nozzle so that air is efficiently diverted into the ram burner or allowed to continue to the exit in the correct flow pattern. This may or may not be the proper shape to provide for opening and closing vent 30 of FIG. 3. An advantage is achieved by using separate members 31 and 28, as shown in FIG. 2.

A single annular bypass duct 22 within housing 10, surrounding the turbojet and ramjet engines, is shown in FIG. 2. The barrier 28 and vent member 35 are composed of a multiplicity of members arranged around the periphery of the inner wall of duct 22. In the embodiment of FIG. 3, the barrier 28 is constructed in a similar manner. In a different embodiment, the annular bypass duct 22 is divided into a plurality of separate bypass ducts, isolated from each other, each having respective vents and barriers operating to permit the correct amount of air to enter the ramjet engine.

Figure 4:
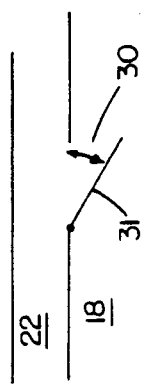
FIG. 4 is a side elevation of an alternative embodiment of a vent.

The embodiment of FIG. 3 may also utilize a vent member 31, illustrated in FIG. 4.

Figure 5:
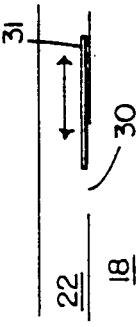
FIG. 5 is a side elevation of an alternative embodiment of a vent.

FIG. 5 shows another embodiment of the vent member 31. This embodiment requires the minimum amount of mechanical hardware. The amount of air entering the ramjet 18 can be precisely controlled using this type of vent member 35 in conjunction with barrier 28, or the size of the nozzle 26 may be adjusted using structure 32 to control the flow of air through the vent 30 in the embodiment of FIG. 5 and a barrier member is not necessary.

One advantage of this invention is that exhaust nozzle drag is reduced along with inlet drag. Ducting excess inlet air past the nozzle throat 15 and exhausting it in the divergent portion of the nozzle helps to fill the exit of internal expansion nozzles or effective exit area of external expansion nozzles. Adding the bypass flow to the nozzle exit flow allows internal expansion nozzles to maintain a larger exit area, reducing required boattailing and external nozzle drag. The effect is similar in external expansion nozzles, where aerodynamic boattailing is reduced and a better thrust-minus-drag coefficient is achieved. Thus, bypassing excess inlet flow and exhausting it downstream of the nozzle throat not only reduces inlet spillage or "shutter" drag, but also reduces nozzle boattail or base drag.

The tandem turbo-ramjet hypersonic propulsion system, as shown on FIG. 2, operates as follows. From low speeds, such as during takeoff and landing, and up to about Mach 3.0, the turbojet is in operation. The vents 30 are closed and all air entering the bypass duct at 24 exits the bypass duct at 26. The exhaust from the turbojet 16 exits through the ram burner where additional fuel may be added if desired for afterburning. When no afterburning is desired, the flame holders 20 may be retracted, if desired, and positioned flush against the inner surface 42 to not interfere with the flow of air in the exhaust from the turbojet. Because the turbojet uses much less air than supplied by an inlet sized for maximum ramjet requirements, a significant amount of air enters the bypass duct and exits without participating in the operation of the turbojet engine. With mixed-compression inlets, the size of the bypass duct must be large enough to permit "starting" the inlet at the selected flight Mach number by bypassing all the excess air entering the inlet 12 at or above the starting Mach number. As the aircraft accelerates, it will reach a speed at which turbojet efficiency and thrust decline and ramjet efficiency and thrust increase rapidly. This will occur at about Mach 3 for some designs but may be of a faster or slower speed, depending on the design of the ramjet and the turbojet engines. In this speed range, the vent 30 may be partially opened to provide the additional air to the ram burner. The air not channeled into the ram burner continues to exit as cold bypass air.

The dual operation of the turbojet and bypass duct continues until the speed is so high as to make further operation of the turbojet inefficient or impractical. This will likely occur about Mach 3.5 but may be at different speeds, depending on the design of the turbojet engine. When the ramjet is the only engine operating, the turbojet is isolated by shutters 52 and 54 and all of the air entering the inlet 12 is bypassed around the turbojet. The inlet 12 is sized to provide the necessary air to achieve top thrust at top speed, and this inlet size is often in excess of the size required by the ramjet for acceleration at slower speeds. Thus, during acceleration to cruising speeds, with the turbojet not in operation, the amount of air entering the inlet 12 is often in excess of that required by the ramjet at the optimum fuel/air ratio. At such speeds, the barrier 28 is not completely closed and some air from the bypass duct enters the ram burner 18 and some exits as cold bypass air at 26. This function can also be provided using the size of the opening at nozzle 26 or throat 27 to direct the desired amount of air into the ramjet and an additional barrier is not needed. The structure 32 or throat 27 may act as the barrier. As the ram burner requires, or can pass, more air at higher speeds, the barriers 28 are closed further, and vents 30 opened further to provide the correct amount of air into the ram burner. When the ramjet engine is approaching top speed, the barriers 28 are completely closed and all the air entering inlet 12 is provided to ram burner 18 through the vent 30 with no cold bypass air exiting at 26. The position of barrier 28 is adjusted throughout the flight to provide the correct amount of air to the ram burner 18. The invention thus provides a bypass duct for the ramjet engine when the turbojet engine is not operating and only the ramjet engine is operating.

In the embodiment using a plurality of isolated bypass ducts 22 having respective vents and barriers, the vents and barriers may operate independently in each duct and of each other. The vents are openable to a plurality of positions, from completely open to completely closed and in a range of positions in-between. If only a small amount of air is required by ramjet 18, then only three or four of the vents may be opened. Air from these bypass ducts enters the ramjet and all of the air in the nonselected bypass ducts exits as cold bypass air. As more air is needed for the ramjet, then more of the vents are opened; and at the maximum air requirements, all the vents are opened.

The invention has been described with respect to a number of embodiments, but any hypersonic propulsion system making use of these embodiments or equivalents thereof falls within the scope of this invention.

I claim:

1. A hypersonic propulsion system comprising:
a housing enclosing a turbojet engine and a ram burner;
an air inlet coupled to said housing for providing air to said turbojet engine and said ram burner;
a turbojet nozzle having a throat coupled to said housing for providing an exhaust from said turbojet engine and said ram burner;
a bypass duct enclosed in said housing and receiving bypass air from said inlet and exhausting said bypass air at a bypass outlet, said bypass outlet being located behind the throat of said turbojet nozzle;
a vent in said bypass duct selectively permitting bypass air to enter said ram burner;
a vent member positioned within said vent for selectively opening said vent to a predetermined vent area;
a barrier member in said bypass duct selectively directing the bypass air into said vent or said bypass duct outlet; and
a bypass throat member positioned within said bypass duct, said bypass throat member being movable to provide a variable throat area within said bypass duct, said bypass throat being located aft of said turbojet nozzle throat.

2. The hypersonic propulsion system of claim 1 wherein said bypass outlet has a variable outlet area.

3. The hypersonic propulsion system of claim 1 wherein said bypass outlet forms a portion of said exhaust nozzle.

4. The hypersonic propulsion system of claim 1 wherein said predetermined vent area forces all of said bypass air into said ram burner.

5. The hypersonic propulsion system of claim 1 wherein said predetermined vent area permits none of said bypass air to enter said ram burner.

6. The hypersonic propulsion system of claim 1 wherein said predetermined vent area permits some but not all of said bypass air to enter said ram burner.

7. The hypersonic propulsion system of claim 1 wherein the amount of air entering said ram burner is selectively controlled in response to an external signal.

8. The hypersonic propulsion system of claim 1, further comprising a plurality of flame holders in said ram burner, said flame holders being retractable to a position adjacent said bypass duct when said ram burner is not in operation and being placed in said ram burner when said ram burner is in operation.

9. The engine of claim 1 wherein said bypass duct includes a plurality of bypass ducts, each having a separate inlet and outlet and each having a movable barrier operating independently of each other.

10. The hypersonic propulsion system of claim 1 wherein said bypass duct includes a plurality of bypass ducts enclosed in said housing.

11. The hypersonic propulsion system of claim 10 wherein each of said bypass ducts has a vent member and a barrier member, said respective vent members and barrier members for each bypass duct operating independently of similar members for other bypass ducts.

12. The hypersonic propulsion system of claim 1 wherein said turbojet and said ram burner are in tandem with said housing.

13. The hypersonic propulsion system of claim 1 wherein a portion of said air enters said ramjet, a portion exits at said bypass outlet, and none enters the turbojet when the turbojet is not in operation.

14. The hypersonic propulsion system of claim 1, further including shutters located prior to the turbojet engine for preventing air from entering said turbojet engine when said turbojet engine is not in operation.

15. A hypersonic propulsion system comprising:
a housing enclosing a turbojet engine and a ramjet engine;
an air inlet coupled to said housing for providing air to said turbojet engine and to said ramjet engine;
a turbojet exhaust nozzle, having a throat, coupled to said housing for providing an exhaust from said turbojet engine; and
a plurality of bypass ducts enclosed within said housing, each of said ducts having a separate inlet and outlet and each having a movable barrier positionable therein, operating independently of each other, each of said ducts including a vent forward of said movable barrier member such that said barrier member selectively causes air to enter said vent, said vent being coupled between said respective bypass ducts and said ramjet engine, said bypass ducts receiving bypass air entering at said inlet and exhausting air at a bypass outlet, said bypass outlet including a throat, said bypass throat being located behind said turbojet nozzle throat.

16. The hypersonic propulsion system of claim 15 wherein said bypass duct means includes a ramjet engine having flame holders in said bypass duct.

17. The hypersonic propulsion system of claim 16 wherein said flame holders are retracted to a position adjacent a wall of said bypass duct when said ramjet engine is not in operation.

18. The hypersonic propulsion system of claim 15 wherein said bypass outlet forms a part of said turbojet exhaust nozzle.

19. The hypersonic propulsion system of claim 16, further including a barrier member for selectively channeling a portion of said bypass air into said ramjet engine.

* * * * *